(12) United States Patent
Ozaki et al.

(10) Patent No.: US 7,563,974 B2
(45) Date of Patent: Jul. 21, 2009

(54) STORAGE MEDIUM STORING SOUND PROCESSING PROGRAM AND SOUND PROCESSING APPARATUS

(75) Inventors: Yuichi Ozaki, Kyoto (JP); Kenji Yamamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 280 days.

(21) Appl. No.: 11/520,674

(22) Filed: Sep. 14, 2006

(65) Prior Publication Data

US 2007/0180978 A1  Aug. 9, 2007

(30) Foreign Application Priority Data

Feb. 3, 2006  (JP) .............................. 2006-027482

(51) Int. Cl.
*G10H 1/00* (2006.01)
(52) U.S. Cl. ............................ 84/615; 84/653; 715/771
(58) Field of Classification Search ................... 84/615, 84/653, 626, 633, 665; 715/771, 773
See application file for complete search history.

(56) References Cited

U.S. PATENT DOCUMENTS

| | | | | |
|---|---|---|---|---|
| 5,290,966 A | * | 3/1994 | Aoki ............................ 84/626 |
| 5,355,762 A | * | 10/1994 | Tabata ......................... 84/609 |
| 5,890,116 A | * | 3/1999 | Itoh et al. .................... 704/260 |
| 6,046,396 A | | 4/2000 | Miyamoto | |
| 6,063,994 A | * | 5/2000 | Kew et al. ..................... 84/600 |
| 6,687,193 B2 | * | 2/2004 | Jung ............................... 369/4 |
| 6,924,425 B2 | * | 8/2005 | Naples et al. ................. 84/609 |
| 2001/0035087 A1 | * | 11/2001 | Subotnick .................... 84/600 |
| 2002/0144588 A1 | * | 10/2002 | Naples et al. ................. 84/609 |
| 2002/0162445 A1 | * | 11/2002 | Naples et al. ................. 84/610 |
| 2003/0028516 A1 | * | 2/2003 | Nakata et al. ................... 707/1 |
| 2003/0159567 A1 | * | 8/2003 | Subotnick .................... 84/626 |
| 2005/0241462 A1 | * | 11/2005 | Hirano ........................ 84/600 |
| 2006/0152485 A1 | * | 7/2006 | Kobayashi et al. .......... 345/157 |
| 2008/0147216 A1 | * | 6/2008 | Pomerantz et al. ............ 700/94 |
| 2008/0150907 A1 | * | 6/2008 | Park et al. .................... 345/173 |

FOREIGN PATENT DOCUMENTS

| | | |
|---|---|---|
| DE | 100 42 300 | 3/2002 |
| JP | 4-98297 | 3/1992 |
| JP | 08096154 A * | 4/1996 |
| JP | 10-282956 | 10/1998 |
| WO | 01/71470 | 9/2001 |

* cited by examiner

*Primary Examiner*—David S. Warren
(74) *Attorney, Agent, or Firm*—Nixon & Vanderhye P.C.

(57) ABSTRACT

A plurality of areas are set on an image displayed on a display screen, and a plurality of performance indexes, each of which indicates a range of each of the areas, are displayed. An area designated by an operation input is detected, and sound output information is generated when an operation input, which designates one of the areas, and then further designates another area other than the designated area, is detected. Thereafter, a sound is outputted from a speaker in accordance with the sound output information.

15 Claims, 9 Drawing Sheets

STORAGE MEDIUM STORING SOUND PROCESSING PROGRAM AND SOUND PROCESSING APPARATUS

CROSS REFERENCE TO RELATED APPLICATION

The disclosure of Japanese Patent Application No. 2006-027482 is incorporated herein by reference.

BACKGROUND

1. Field

Example embodiments of the present invention relates to a storage medium storing a sound processing program and a sound processing apparatus. More particularly, example embodiments of the present invention relates to a storage medium storing a sound processing program and a sound processing apparatus, both capable of realizing an electronic musical instrument which simulates a play of a musical instrument by means of an apparatus such as a personal computer, a game apparatus or the like.

2. Description of the Background Art

Conventionally, an apparatus, realizing an electric musical instrument which simulates a play of a musical instrument by means of a personal computer, a game apparatus or the like, is well-known. In such an apparatus, a musical performance is provided in accordance with an output from operation means such as a pointing device (e.g., a mouse), a controller and the like, and a sound is outputted by adopting an input method different from that by which a real musical instrument is played.

Japanese Laid-Open Patent Publication No. 10-282956 (hereinafter, referred to as patent document 1), discloses an apparatus to which information regarding a method of playing a stringed instrument is inputted by means of a fingerboard of the stringed instrument displayed on a display device, for example. Frets and strings of a simulated guitar are displayed on the fingerboard. When information regarding a choking method, which is unique to the guitar, is inputted, a user uses a mouse so as to operate an image of a string to be choked as if he or she played the instrument by using the choking method, thereby inputting the information regarding the choking method. Note that the choking method is a guitar technique in which an interval of a sound is increased by a semitone to one tone and a half. In the choking method, the user moves his or her finger, pressing at least one string, generally on the same fret, up and down without sliding the finger to another fret. Also, Japanese Laid-Open Patent Publication No. 4-98297 (hereinafter, referred to as patent document 2) discloses an electric musical instrument to which an operation is inputted by means of a playing operation surface and a playing operation element, thereby generating playing information in accordance with the inputted operation.

However, the apparatus disclosed in patent document 1, only specialized in inputting the information regarding the choking method by means of the mouse, does not simulate a musical play as if the user plucked a string of the guitar by means of the mouse. Thus, the user is not allowed to feel as if he or she enjoyed playing the electric musical instrument. Also, in the apparatus disclosed in patent document 2, a main subject used by the user to play the instrument is a keyboard. Furthermore, the aforementioned apparatus is not aimed at allowing the user to enjoy simulating a play of the electric musical instrument by inputting an operation by means of the playing operation surface and the playing operation element. Furthermore, if the apparatus disclosed in patent document 1 and the apparatus disclosed in patent document 2 were combined with each other, playing information causing an electric musical instrument to play music would only be inputted, and therefore the user would not be allowed to enjoy simulating the play of the electric musical instrument.

SUMMARY

Therefore, in order to solve at least one problem mentioned above, example embodiments of the present invention is to provide a storage medium storing a sound processing program and a sound processing apparatus, both realize an operating environment in which an image simulating a portion of a musical instrument is displayed on a display screen of a personal computer, an game apparatus or the like, and a player feels as if he or she played the musical instrument displayed on the display screen by means of operation means such as a pointing device, a controller, etc.

Example embodiments of the present invention have the following features to attain the solution mentioned above. Note that reference numerals and step numbers (step is abbreviated as "S", and only the step numbers are denoted) are shown in parentheses below for assisting a reader in finding corresponding components in the figures to facilitate the understanding of the example embodiments of the present invention, but they are in no way intended to restrict the scope of the invention.

A first aspect is directed to a storage medium storing a sound processing program which causes a sound processing apparatus (1) to function as a music playing apparatus, the sound processing apparatus to be operated in accordance with an operation input received from an input device (14, 15) operated by a player. The sound processing program instructs a computer (21) of the sound processing apparatus to perform: an area setting step (S51); a performance index display controlling step (S53); an operation history storing step (S52); an area detecting step (S55, S57 to S60, S62, S76, S80, S82); a sound output information generating step (S72, S73, S77, S78); and a sound output controlling step (S74, S79). The area setting step sets a plurality of areas (A) on an image displayed on display screen (12). The performance index display controlling step displays performance indexes (ST1 to ST6), stored in a memory (24), each of which indicates a range of each of the plurality of areas on the display screen. The operation history storing step stores a history of an operation input received from the input device in the memory (Da). The area detecting step detects one of the areas designated in accordance with the operation input. The sound output information generating step generates sound output information when, in the area detecting step, the operation input, which designates the one of the areas, and further designates an area other than the area having been designated, is detected based on the history of the operation input. The sound output controlling step outputs a sound from a speaker (30a, 30b) in accordance with the sound output information.

In a second aspect based on the first aspect, in the area setting step, the plurality of areas are set to be adjacent to and in parallel with each other (FIG. 4). In the performance index display controlling step, the performance indexes, each of which indicates a boundary between each two of the areas adjacent to each other, are displayed on the display screen.

In a third aspect based on the second aspect, in the area setting step, a boundary range having a predetermined width (Dmax) is set in a vicinity of the boundary between each two of the areas adjacent to each other. In the area detecting step, the operation input, which designates an area within the boundary range or an area beyond the boundary range, is further detected (S76). Also, in the sound output generating step, the sound output information is generated (S77, S78) when, in the area detecting step, the operation input, which designates the one of the areas, and crosses over the boundary range set in the vicinity of the boundary between the area and another area adjacent to the area such that the said another area is further designated, is detected (Yes in S76) based on the history of the operation input.

In a fourth aspect based on the third aspect, in the performance index display step, each of the performance indexes is deformed within the boundary range in accordance with the operation input, and displayed on the display screen.

In a fifth aspect based on the second aspect, the sound processing program instructs the computer to further perform an operation input detecting step (S54). The operation input detecting step detects whether or not an operation input is received from the input device. In the area setting step, a boundary range having a predetermined width is set in a vicinity of the boundary between each two of the areas adjacent to each other. In the area detecting step, the operation input, which designates an area within the boundary range or an area beyond the boundary range, is further detected. Also, in the sound output generating step, the sound output information is generated (S72, S73) when, in the area detecting step, the operation input, which designates the one of the areas, and crosses over the boundary range set in the vicinity of the boundary between the area and another area adjacent to the area such that the said another area is further designated, is detected based on the history of the operation input, and in the operation input detecting step, it is detected that the operation input detected by the area detecting step is lost (Yes in S71).

In a sixth aspect based on the fifth aspect, in the performance index display controlling step, each of the performance indexes is deformed within the boundary range in accordance with the operation input, and displayed on the display screen.

In a seventh aspect based on the first aspect, in the sound output generating step, when the one of the areas is designated, and an area other than the area having been designated is further designated, an interval of the sound to be reproduced is determined in accordance with a combination of the areas having been designated.

In an eighth aspect based on the second aspect, in the sound output generating step, when the one of the areas is designated, and an area other than the area having been designated is further designated, an interval of the sound to be reproduced is determined in accordance with one of the performance indexes displayed on a boundary between the areas having been designated.

In a ninth aspect based on the first aspect, the input device includes a pointing device (15) of outputting, in accordance with an operation performed by the player, input coordinates corresponding to a coordinate system of the display screen, as the operation input. In the area setting step, the plurality of areas are set to be adjacent to and in parallel with each other. Each of the performance indexes is an image simulating a portion of a musical instrument (a string image), and disposed on a boundary between each two of the areas adjacent to each other. In the operation history storing step, a history of the input coordinates outputted from the pointing device is stored in the memory. In the area detecting step, one of the areas including a position indicated by the input coordinates is detected as an area designated in accordance with the operation input. Also, in the sound output information generating step, the sound output information is generated, when it is detected in the area detecting step that the area including the position indicated by the input coordinates is changed to another area, in accordance with one of the performance indexes disposed on the boundary between the area and the said another area. Note that the pointing device is an input device for specifying a position or coordinates inputted on the screen, and may be a touch panel, a mouse, a trackball and the like.

In a tenth aspect based on the ninth aspect, in the sound output information generating step, a volume of the sound to be reproduced is determined (S73, S78) in accordance with a speed at which the input coordinates move from the area to the said another area.

In an eleventh aspect based on the ninth aspect, the pointing device is a touch panel (15) covering the display screen. In the operation history storing step, a history of touch coordinates at which the player touch-operates the touch panel is stored in the memory. In the area detecting step, one of the areas, within which a position indicated by the touch coordinates is overlapped, is designated, as an area designated in accordance with the operation input. Also, in the sound output generating step, the sound output information is generated when it is detected, in the area detecting step, that the area, within which the position indicated by the touch coordinates is overlapped, is changed to another area based on the history of the touch coordinates.

In a twelfth aspect based on the ninth aspect, the input device includes the pointing device and other operation section (14a, 14L) other than the pointing device. The sound processing program instructs the computer to further perform an operation signal obtaining step (S52) of obtaining an operation signal outputted from the operation section (Db). Also, in the sound output information generating step, an interval of the sound is set, when the area including the position indicated by the input coordinates is changed to another area, in accordance with a combination of the area and said another area, and an interval of the sound to be reproduced is determined by varying the interval of the sound in accordance with the obtained operation signal.

A thirteenth aspect is a sound processing device to be operated in accordance with an operation input received from an input device operated by a player. The sound processing apparatus comprises: storage means, area setting means, performance index display controlling means, operation history storing means, area detecting means, sound output information generating means, and sound output controlling means. The area setting means sets a plurality of areas on an image displayed on a display screen. The performance index display controlling means displays performance indexes, stored in the storage means, each of which indicates a range of each of the plurality of areas on the display screen. The operation history storing means stores a history of an operation input received from the input device in the storage means. The area detecting means of detecting one of the areas designated in accordance with the operation input. The sound output information generating means of generating sound output information when, in the area detecting means, the operation input, which designates the one of the areas, and further designates an area other than the area having been designated, is detected based on the history of the operation input. Also, the sound output controlling means outputs a sound from a speaker in accordance with the sound output information.

According to the first aspect described above, a sound is not reproduced in accordance with an operation in which any of the areas is designated. Instead, a sound is reproduced in accordance with an operation in which an area designated by the player is changed to another area. Therefore, the areas are displayed on the display screen, and the input device such as a pointing device and a controller is used, thereby making it possible to realize an operating environment in which the player feels as if he or she played a musical instrument, such as a stringed instrument, displayed on the display screen.

According to the second aspect described above, it is possible to provide an operating environment in which a sound is reproduced by plucking the performance indexes, each of which is disposed between each two of the areas.

According to the third and fifth aspects described above, each of the performance indexes, which indicates the boundary of each two of the areas, is set to be bended within a predetermined range. Therefore, a property unique to a real string can be provided for each of the performance indexes, thereby making it possible to provide a more realistic operating environment.

According to the fourth and sixth aspects described above, each of the performance indexes, which indicates the boundary of each two of the areas, is displayed so as to be bended within the predetermined range, thereby making it possible to represent each of the performance indexes as if it were the real string.

According to the seventh and eighth aspects described above, the interval of the sound varies in accordance with the combination of the areas having been designated and one of the performance indexes displayed on the boundary between the areas having been designated, thereby making it possible to represent a plurality of strings, included in the stringed instrument, which reproduce intervals of sounds different from each other.

According to the ninth aspect described above, the pointing device is used when inputting an operation. Therefore, an environment, in which the player feels as if he or she directly operated the performance indexes (the musical instrument) displayed as the image, can be realized, thereby making it possible to provide an operating environment in which the player feels as if he or she played a more realistic musical instrument.

According to the tenth aspect described above, it becomes possible to represent a simulated phenomenon in which the volume of the sound to be reproduced varies depending on a strength at which a string included in a real stringed instrument is plucked.

According to the eleventh aspect described above, the touch panel is used when inputting the operation. Therefore, an environment, in which the player feels as if he or she directly touched the performance indexes (the musical instrument) displayed as the image, can be realized, thereby making it possible to provide an operating environment in which the player feels as if he or she played a more realistic musical instrument.

According to the twelfth aspect described above, the interval of the sound to be reproduced varies in accordance with an operation performed via the pointing device and an operation performed via the other operating section, thereby making it possible to reproduce a wide variety of the sound.

Furthermore, according to the sound processing apparatus of example embodiments of the present invention, it becomes possible to obtain an effect similar to the aforementioned storage medium storing the sound processing program.

These and other features, aspects and advantages of example embodiments of the present invention will become more apparent from the following detailed description of the example embodiments of present invention when taken in conjunction with the accompanying drawings.

DESCRIPTION OF THE EXAMPLE EMBODIMENTS

Figure 1:
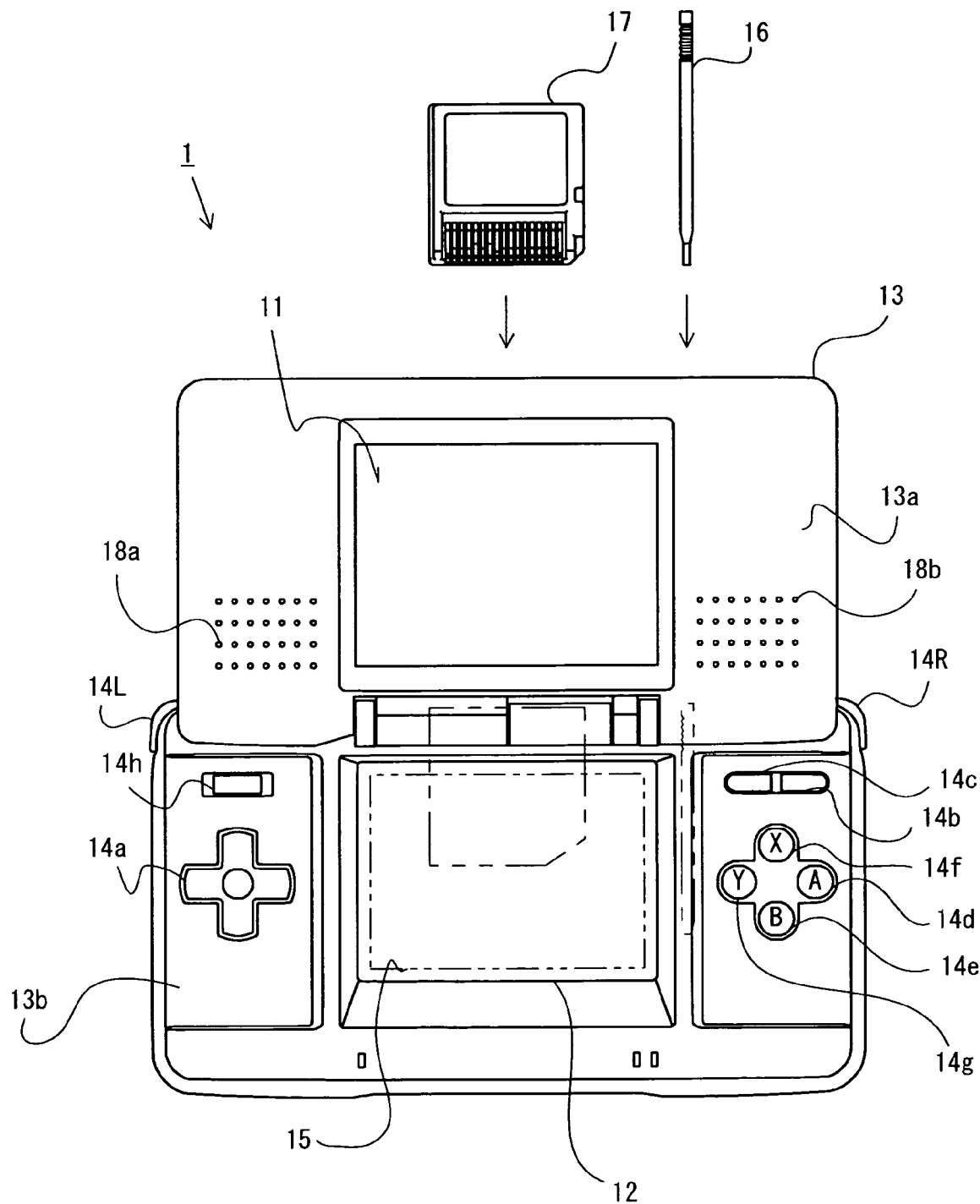
FIG. 1 is an external view of a game apparatus 1 which executes a game program according to example embodiments of the present invention.

Hereinafter, a sound processing apparatus which executes a sound processing program according to an example embodiment of the present invention will be described with reference to drawings. The sound processing program according to an example embodiment of the present invention can be used by causing any computer system in which an image can be displayed on a display device to be executed. However, the present embodiment will be described with respect to a sound processing program included in a game program to be executed by a game apparatus 1 as an example of an information processing apparatus. FIG. 1 is an external view of the game apparatus 1 which executes the game program according to an example embodiment of the present invention. In the present embodiment, a hand-held game apparatus is used as an example of the game apparatus 1.

In FIG. 1, the game apparatus 1 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 2) to an exterior.

The lower housing 13b is provided with input devices as follows; a cross switch 14a, a start switch 14b, a select switch 14c, an "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13*b* further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. Although the following description is provided on an assumption that a player uses a stick 16 to operate the touch panel 15, of course the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13*b* in a removable manner.

Figure 2:
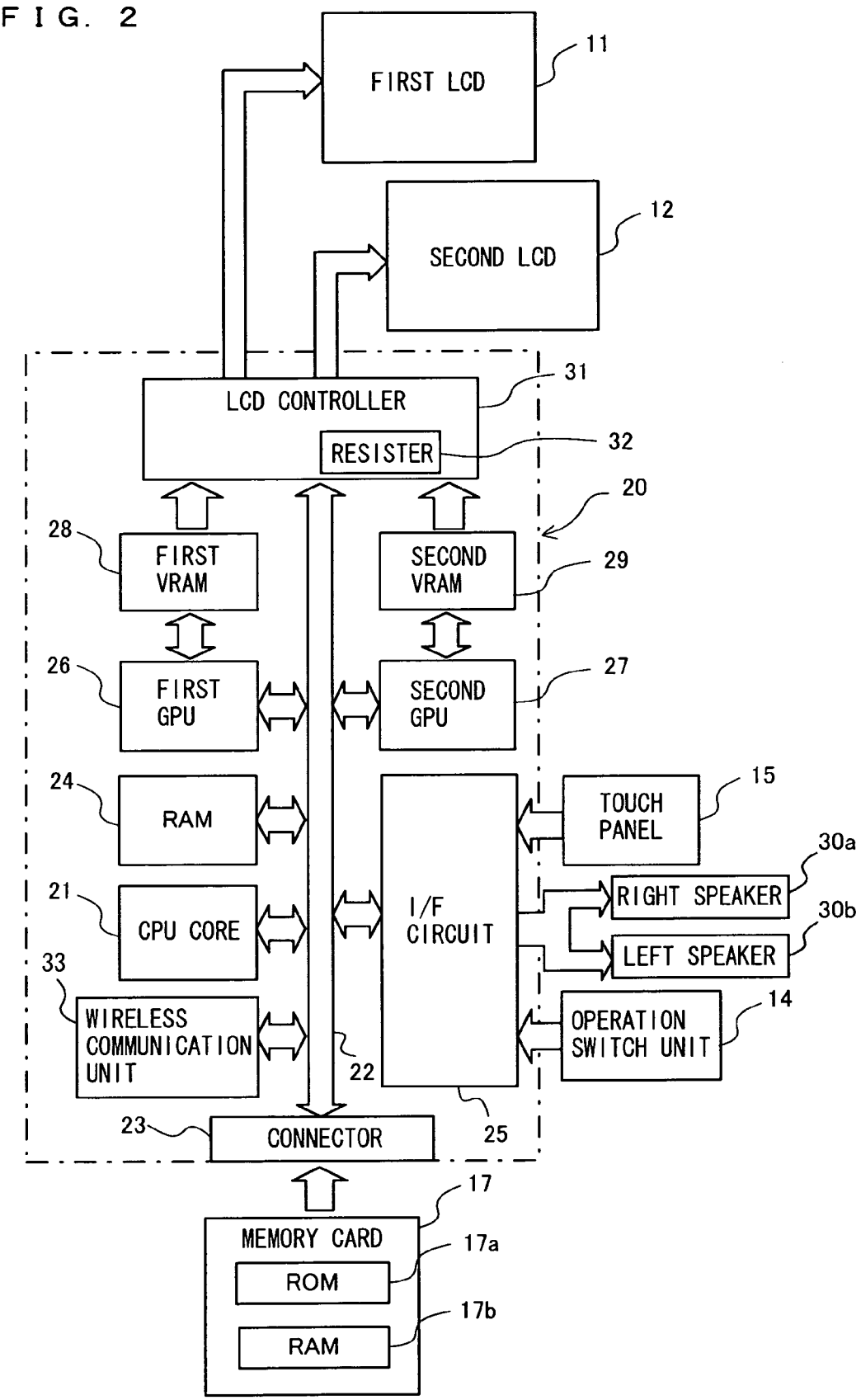
FIG. 2 is a block diagram illustrating an internal configuration of the game apparatus 1.

Next, an internal configuration of the game apparatus 1 will be described with reference to FIG. 2. FIG. 2 is a block diagram illustrating the internal configuration of the game apparatus 1.

In FIG. 2, a CPU core 21 is mounted on an electronic circuit board 20 which is to be housed in the housing 13. Through a bus 22, the CPU core 21 is connected to a connector 23, an input/output interface circuit (shown as I/F circuit in the diagram) 25, a first GPU (Graphics Processing Unit) 26, a second GPU 27, a RAM 24, a LCD controller 31, and a wireless communication unit 33. The memory card 17 is connected to the connector 23 in a removable manner. The memory card 17 includes a ROM 17*a* for storing a game program and a RAM 17*b* for storing backup data in a rewritable manner. The game program stored in the ROM 17*a* of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, the touch panel 15, a right loudspeaker 30*a*, a left loudspeaker 30*b*, a wireless communication unit 33, and an operation switch section 14, which is comprised of the cross switch 14*a*, the "A" button 14*d*, and others, as shown in FIG. 1. The right loudspeaker 30*a* and the left loudspeaker 30*b* are arranged inside the sound holes 18*a* and 18*b*, respectively, and reproduce a sound in accordance with sound output information generated by the CPU core 21.

A first VRAM (Video RAM) 28 is connected to the first GPU 26, and a second VRAM 29 is connected to the second GPU 27. In accordance with an instruction from the CPU core 21, the first GPU generates a first game image based on the image data which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the VRAM 28, and outputs to the second LCD 12 the second game image which has been written into the second VRAM 29. When the value of the resister 32 is 1, the first game image which has been written into the first VRAM 28 is outputted to the LCD 12, and the second game image which has been written into the second VRAM 29 is outputted to the first LCD 11.

The wireless communication unit 33 has a function of allowing data used for a game process to be transmitted to and received from the wireless communication units 33 included in other game apparatuses. As an example, the wireless communication unit 33 provides a function of performing wireless communication, which complies with a wireless LAN standard IEEE802.11. The wireless communication unit 33 outputs received data to the CPU core 21. Also, the wireless communication unit 33 transmits data instructed by the CPU core 21 to the other game apparatuses.

The game program according to an example embodiment of the present invention can be supplied to a computer system not only by way of an external storage medium such as a memory card 17, but also by way of a wired or wireless communication path. The game program can also be recorded beforehand in a nonvolatile storage unit in an interior of a computer system. Note that an information storage medium storing the game program is not limited to the nonvolatile storage unit (e.g., semiconductor memory). The information storage medium may also be a CD-ROM, a DVD, or any other optical disk type storage media.

Figure 3:
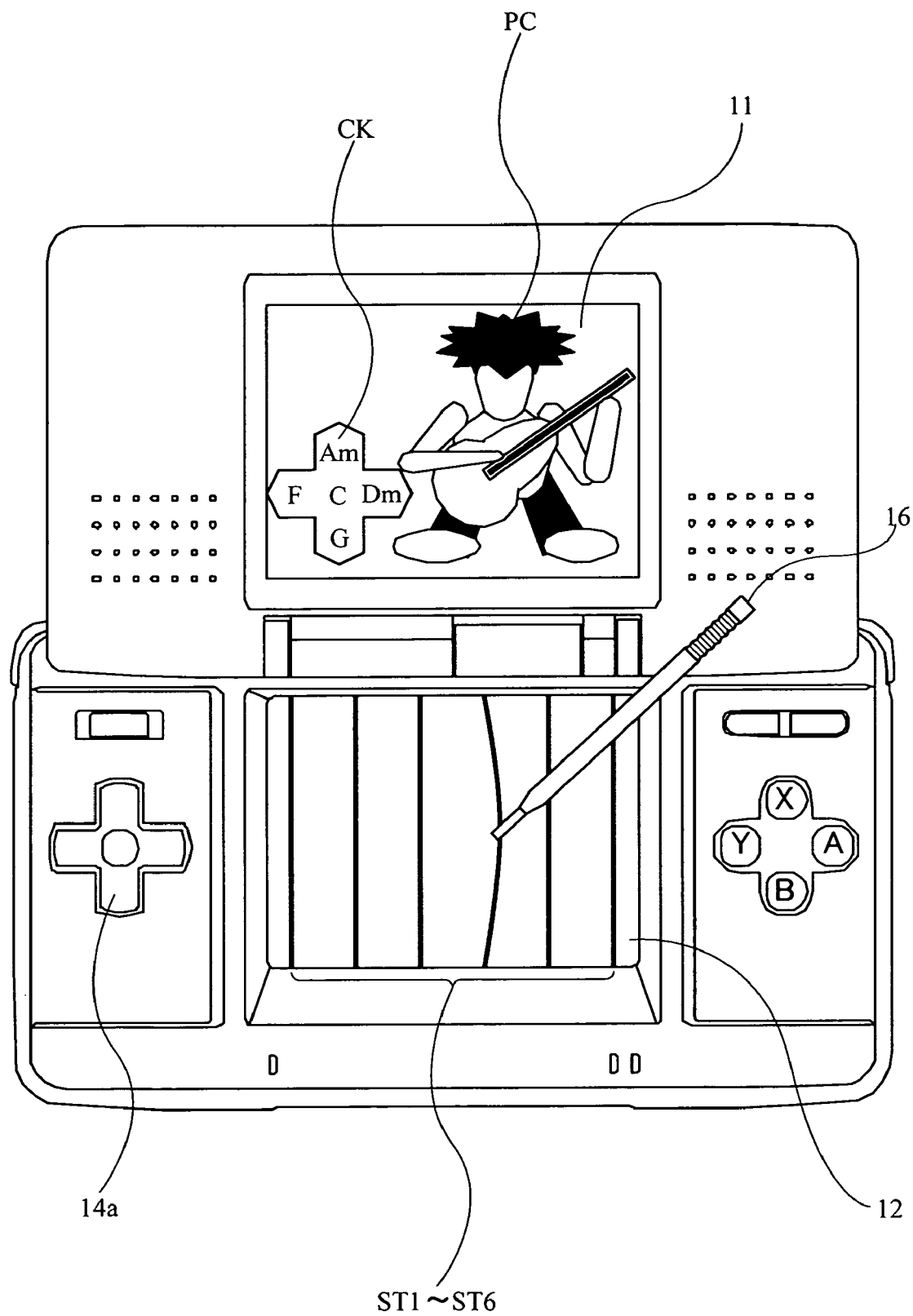
FIG. 3 is a view illustrating an exemplary screen display displayed on a first LCD 11 and a second LCD 12.
Figure 4:
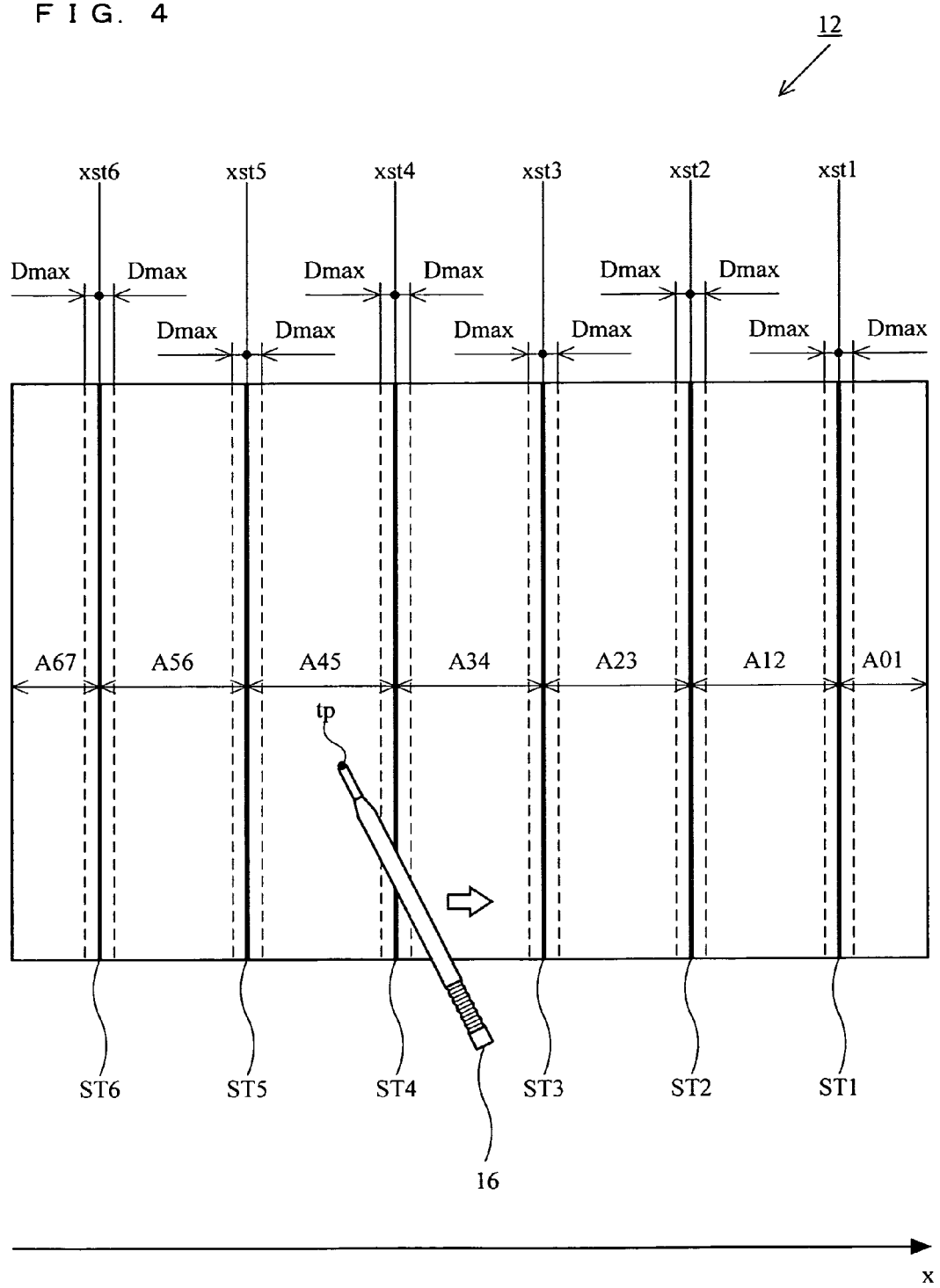
FIG. 4 is a view for describing areas and position coordinates, both of which are set on a game image displayed on the second LCD 12.
Figure 5:
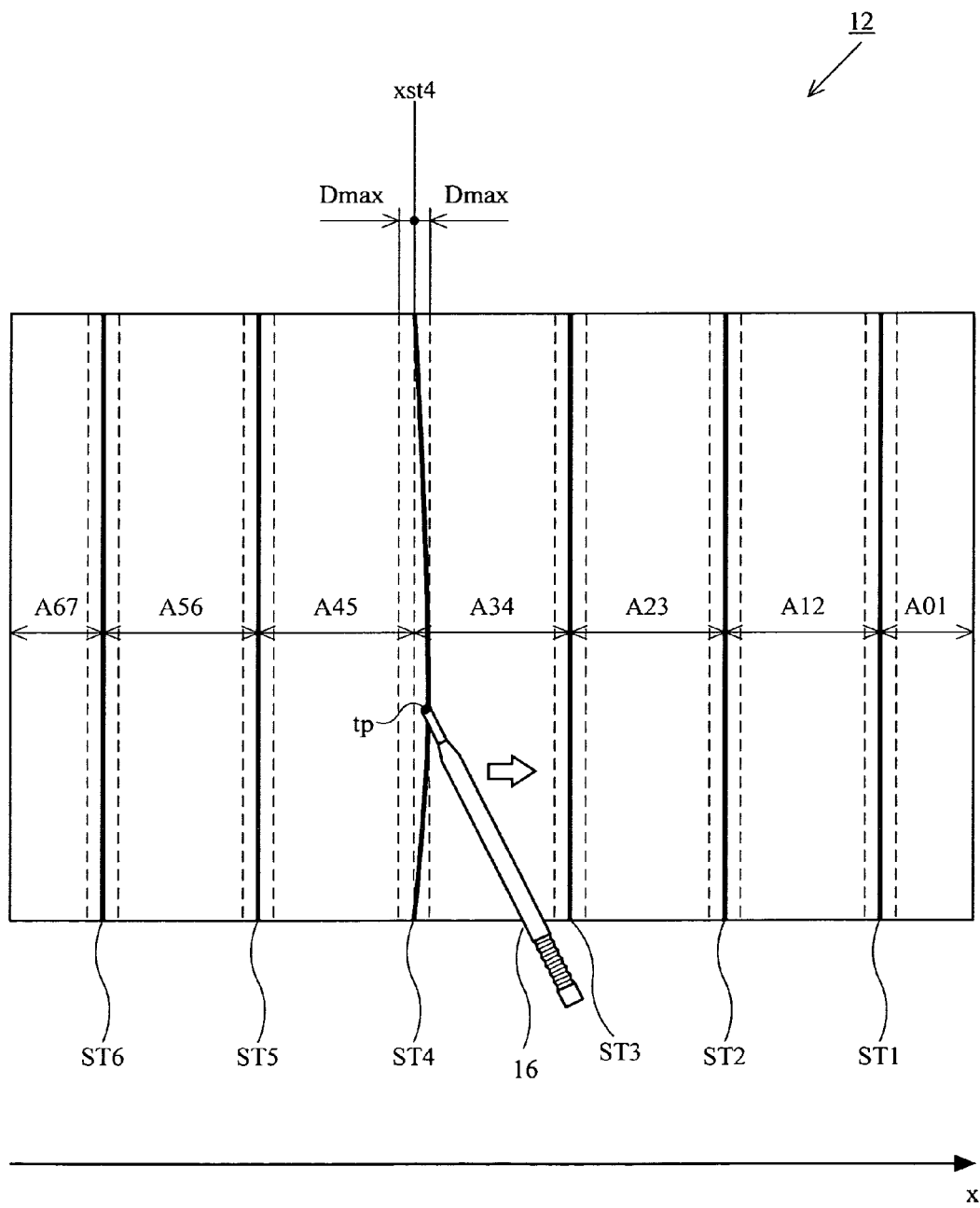
FIG. 5 is a view for describing a process to be executed when a slide operation is performed on a touch panel 15 such that a touch position crosses over a boundary between the areas.
Figure 6:
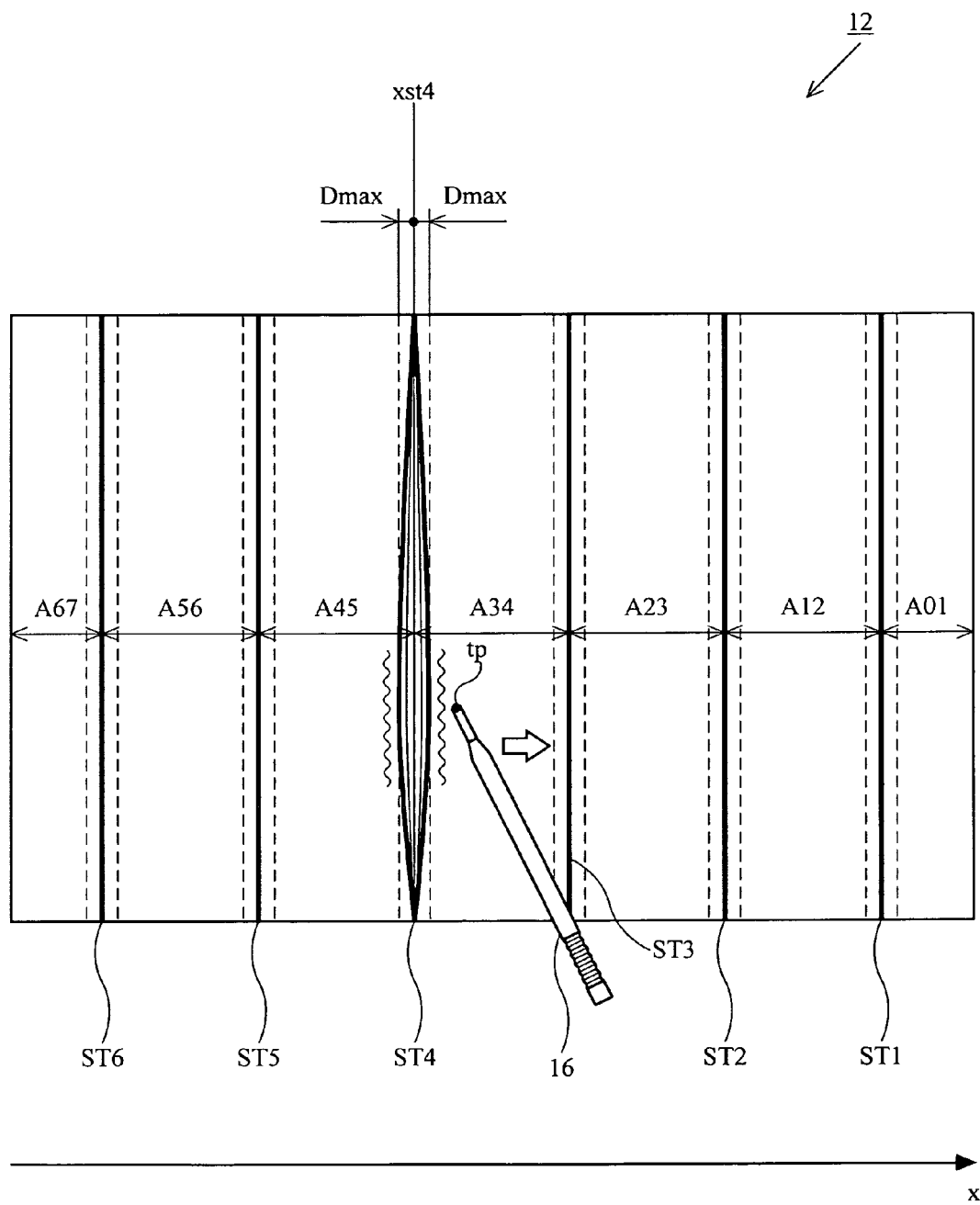
FIG. 6 is another view for describing a process to be executed when a slide operation is performed on a touch panel 15 such that a touch position crosses over a boundary between the areas.

Next, a detailed processing operation of the game program to be executed by the game apparatus 1 will be described with reference to FIGS. 3 to 6. Firstly, an exemplary display mode and exemplary process displayed, on the first LCD 11 and the second LCD 12, in accordance with the detailed processing operation, will be described. Specifically, in the following description, a player uses the game apparatus 1 so as to simulate a play of a stringed instrument. More specifically, a six-stringed guitar is used as an example of the stringed instrument. FIG. 3 is a view illustrating an exemplary screen display displayed on the first LCD 11 and the second LCD 12. FIG. 4 is a view for describing areas and position coordinates, both of which are set on a game image displayed on the second LCD 12. Each of FIGS. 5 and 6 is a view for describing a process to be executed when a sliding operation is performed on the touch panel 15 such that a touch position crosses over a boundary between any two areas displayed on the second LCD 12.

In FIG. 3, a game image is displayed on each of the first LCD 11 and the second LCD 12. In the present embodiment, an image displaying performance indexes according to an example embodiment of the present invention is displayed on the second LCD 12. Thus, the image displayed on the second LCD 12 is hereinafter simply referred to as a "performance index image". Also, a character image, which plays a musical instrument in accordance with an operation inputted from the player using the game apparatus 1 so as to simulate a play of the musical instrument, and an image showing intervals which can be selected by the operation switch section 14 are displayed on the first LCD 11.

A plurality of string images ST1 to ST6 showing six strings of a guitar are displayed on the second LCD 12 as the performance indexes. The string images ST1 to ST6 displayed as the performance indexes indicate a first to a sixth string of the guitar, respectively. For example, the string images ST1 to ST6 are displayed in parallel with each other on the second LCD 12 such that the first to the sixth string of the guitar are arranged in a vertical direction with respect to the game apparatus 1 (i.e., in a fore-and-aft direction along a paper sheet of FIG. 3). Note that at least a portion of the image showing from top ends to bottom ends of the string images ST1 to ST6 is displayed on the second LCD 12. In an example of FIG. 3, the string images ST1 to ST6 showing the first to the sixth string provided on a guitar body portion where the player strokes or plucks the guitar are displayed on the second LCD 12. Specifically, the string images ST1 to ST6 showing the first to the sixth string of the guitar are displayed on the second LCD 12 in an order from right to left.

The player of the game apparatus 1 touch-operates the touch panel 15 provided on a surface of the second LCD 12, thereby realizing, when a touch position overlaps a portion of any of the string images ST1 to ST6, an operation in which the overlapped string image is caused to be plucked. Note that in the following description, any of the string images ST1 to ST6 to be plucked may be referred to as a "target string image ST". Thereafter, when a touch-operation in which the player drags the target string image ST rightward or leftward (hereinafter, referred to as a "slide operation"), is inputted to the touch panel 15, the target string image ST is deformed so as to be stretched in accordance with the slide operation. In FIG. 3, the target string image ST is the string image ST3 indicating the third string, and a center portion of the target string image ST is deformed so as to be stretched to the right in accordance with a slide operation performed by the player moving the stick 16 in a right direction. Then, when the slide operation is performed such that the target image string ST moves beyond its deformation limit (a tension limit value Dmax), the target string image ST moves as if the player plucked a string corresponding to the target string image ST, and a sound corresponding to the string is to be reproduced from the right speaker 30a and the left speaker 30b.

A character image PC representing a character which plays the guitar in accordance with a touch-operation performed on the touch panel 15 is displayed on the first LCD 11. Also, a code selecting key display CK is displayed on the first LCD 11, and guitar codes which can be selected in accordance with an operation performed by the player pushing front, rear, left and right portions of the cross key 14a are displayed in the code selecting key display CK. For example, in FIG. 3, when the front portion of the cross key 14a is pushed down, a guitar code Am is selected; when the right portion of the cross key 14a is pushed down, a guitar code Dm is selected; when the rear portion of the cross key 14a is pushed down, a guitar code G is selected; when the left portion of the cross key 14a is pushed down, a guitar code F is selected; and when no portion of the cross key 14a is pushed down, a guitar code C is selected. As described above, in the case where the player performs a slide operation on the touch panel 15 so as to pluck each of the string images ST1 to ST6, a sound generated by plucking the each of the string images ST1 to ST6 is reproduced at an interval which corresponds to a guitar code selected by the cross key 14a. That is, when the player touch-operates the touch panel 15 so as to pluck a string image, a sound is reproduced at an interval selected by the cross key 14a.

In FIG. 4, a plurality of string position coordinates xst and areas A are set on the performance index image in order to realize the aforementioned operation by using the touch panel 15. In a screen coordinate system for displaying the performance index image on the second LCD 12, an x-axis is set along a horizontal direction of the second LCD 12 (that is, a direction perpendicular to a vertical direction in which the string images ST1 to ST6 are arranged and displayed). Also, the rightward direction along the x-axis is an x-axis positive direction. Note that in the screen coordinate system, a y-axis is set along a vertical direction perpendicular to the x-axis. However, the y-axis is not used in the following description. Thus, a detailed description thereof will be omitted.

The string images ST1 to ST6 are arranged so as to be displayed along the string position coordinates xst1 to xst6 included on the x-axis, respectively. The performance index image is divided into seven areas A by the six string images ST1 to ST6. Specifically, an area A01 is set between a right end of a display screen of the second LCD 12 and the string image ST1; an area A12 is set between the string image ST1 and the string image ST2; an area A23 is set between the string image ST2 and the string image ST3; an area A34 is set between the string image ST3 and the string image ST4; an area A45 is set between the string image ST4 and the string image ST5; an area A56 is set between the string image ST5 and the string image ST6; and an area A67 is set between the string image ST6 and a left end of the display screen of the second LCD 12. As is clear from FIG. 4, the seven areas A are formed by rectangular areas arranged in parallel with each other perpendicularly to the x-axis. Therefore, each of the areas A can be specified by designating an x-axis coordinate.

Furthermore, a tension limit range is set in a predetermined range extending perpendicularly from both sides of each of the string images ST1 to ST6. Specifically, the tension limit range of each of the string images ST1 to ST6 indicates a region extending toward the x-axis positive direction by a length Dmax and a region extending toward an x-axis negative direction by the length Dmax. The tension limit range indicates, when each of the string images ST1 to ST6 is the target string image ST, a range within which the target string image ST can be deformed by being stretched in accordance with a slide operation. That is, a maximum deforming amount within which each of the string images ST1 to ST6 can be deformed in the right or left direction is the length Dmax.

By using a predetermined function, touch coordinates TP (TX, TY) outputted when the player touch-operates the touch panel 15 are converted into position coordinates tp (xt, yt), in the screen coordinate system, which overlap the touch coordinates TP (TX, TY). Hereinafter, the position coordinates tp (xt, yt) converted into the screen coordinate system is referred to as the "touch coordinates tp (xt, yt)". In FIG. 4, the player touch-operates the touch panel 15 and performs a slide operation so as to move the stick 16 rightward (in the x-axis positive direction; in a direction of a white arrow shown in FIG. 4) within the area A45, thereby setting the touch coordinates tp in the area A45, for example.

In FIG. 5, when the player continues to perform the slide operation so as to move the stick 16 further rightward from a touch-operated state shown in FIG. 4, the touch coordinates tp will overlap a portion of the string image ST4 disposed at a right end of the area A45. Specifically, an x-axis coordinate tx of the touch coordinates tp (hereinafter, simply referred to as a "touch x coordinate tx" becomes equivalent to the string position coordinate xst4 of the string image ST4. Then, even when the player continues to perform the slide operation so as to move the stick 16 even further rightward, the string image ST4 is to be deformed so as to be stretched to the right in accordance with the slide operation being performed if the touch x coordinate tx remain within the tension limit range set at the right side of the string image ST4 (tx≦xst4+Dmax). As illustrated by the string image ST4 shown in FIG. 5, a state in which a string image is to be deformed in accordance with the touch coordinates tp moved further rightward from the string image is referred to as a "hold state" (HOLD). On the other hand, the touch coordinates tp have no effect on the other string images ST1 to ST3, ST5 and ST6, and such a state is refereed to as a "free state" (FREE). For example, the string images ST1 to ST6 shown in FIG. 4 are all in the free states.

In FIG. 6, when the player continues to perform the slide operation so as to move the stick 16 even further rightward from a touch-operated state shown in FIG. 5, the touch x coordinate tx will cross beyond the tension limit range set at the right side of the string image ST4 (tx>xst4+Dmax). At this time, the string image ST4 moves as if the fourth sting was plucked by being released from the hold state generated by the touch-operation, and a sound corresponding to the fourth string is to be reproduced from the right speaker 30a and the left speaker 30b. An interval of the sound is determined by a guitar code selected by the cross key 14a. Thereafter, a state of the string image ST4 is changed from the hold state to the free state.

The above description illustrates an example where the slide operation is performed so as to move the stick 16 rightward. However, even when a slide operation is performed so as to move the stick 16 leftward, and the stick 16 crosses beyond the tension limit range of each of the string images ST1 to ST6, a sound corresponding to each of the string images ST1 to ST6 is to be reproduced. As described above, when a slide operation is performed on the touch panel 15 so as to move the touch position rightward or leftward, and the touch position crosses beyond the tension limit range of each of the string images ST1 to ST6, a sound corresponding to each of the strings images ST1 to ST6 is to be reproduced. Note that when the player performs a slide operation on the touch panel 15 so as to stretch any of the string images ST1 to ST6 to the right or left to be in the hold state (the state shown in FIG. 5, for example), and then releases the touch panel 15, a sound corresponding to the stretched string image is also to be reproduced. Therefore, among the seven areas A set on the performance index image, when the player performs a slide operation such that a touch position in an area A moves to another area A, crossing over a tension limit value Dmax disposed between the two areas, or when the player performs a slide operation such that a touch position in an area A moves to another area A, without crossing over a tension limit value Dmax disposed between the two areas, and then releases the touch panel 15, a sound corresponding to a string image disposed between the two areas is to be reproduced. In other words, in a screen on which a plurality of areas are set, when the player touch-operates the screen such that a touch position moves only within the same area, a sound is not to be reproduced. On the other hand, when the player performs a slide operation such that a touch position moves between two of the areas adjacent to each other, a sound is to be reproduced. A sound is reproduced by such a touch-operation, thereby making it possible to realize an operation in which the player uses the touch panel 15 so as to pluck the string images displayed on the second LCD 12. Thus, it becomes possible to realize an environment in which the player feels as if he or she played a stringed instrument.

Figure 7:
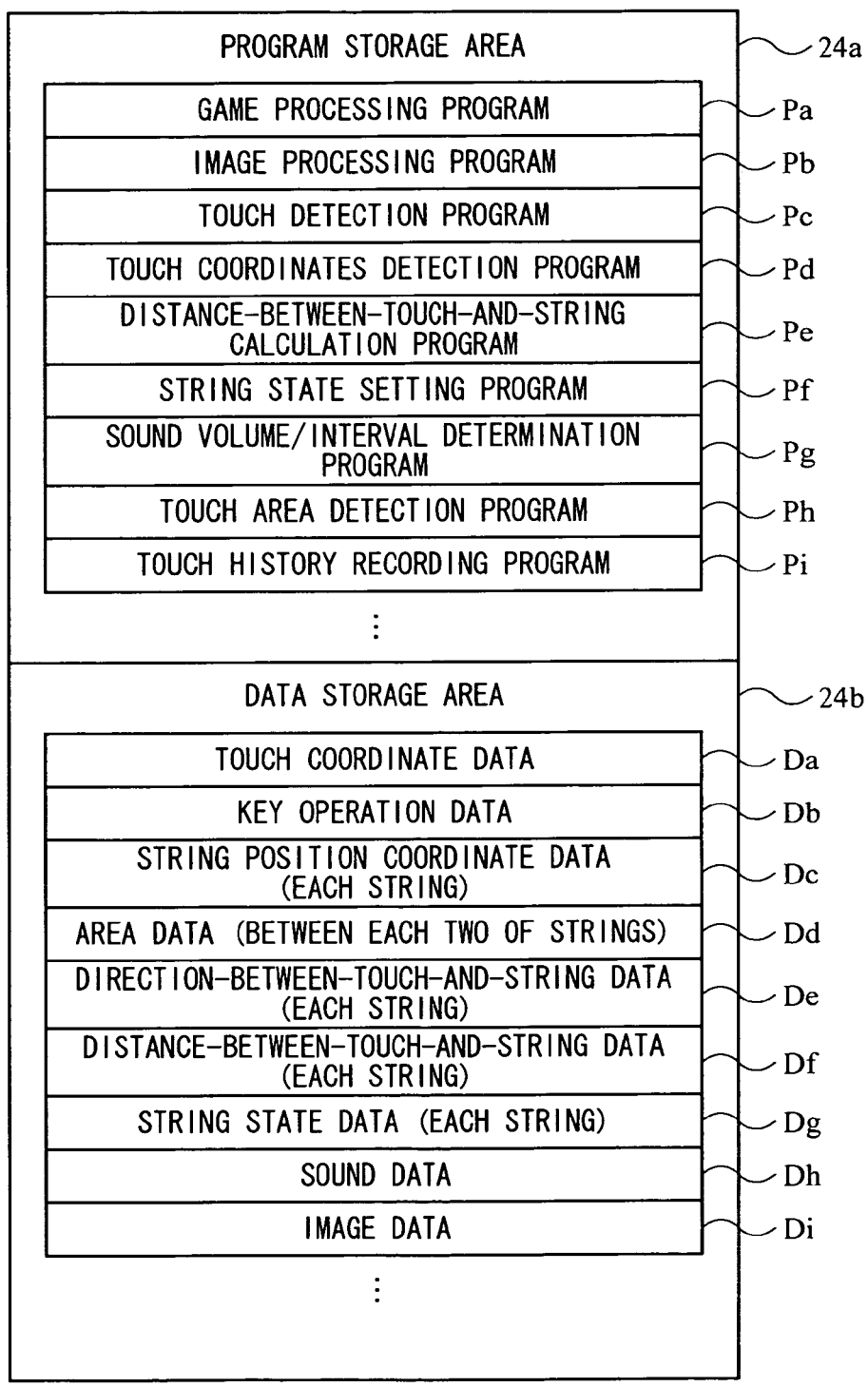
FIG. 7 shows an example of various programs and data stored in a RAM 24.
Figure 8:
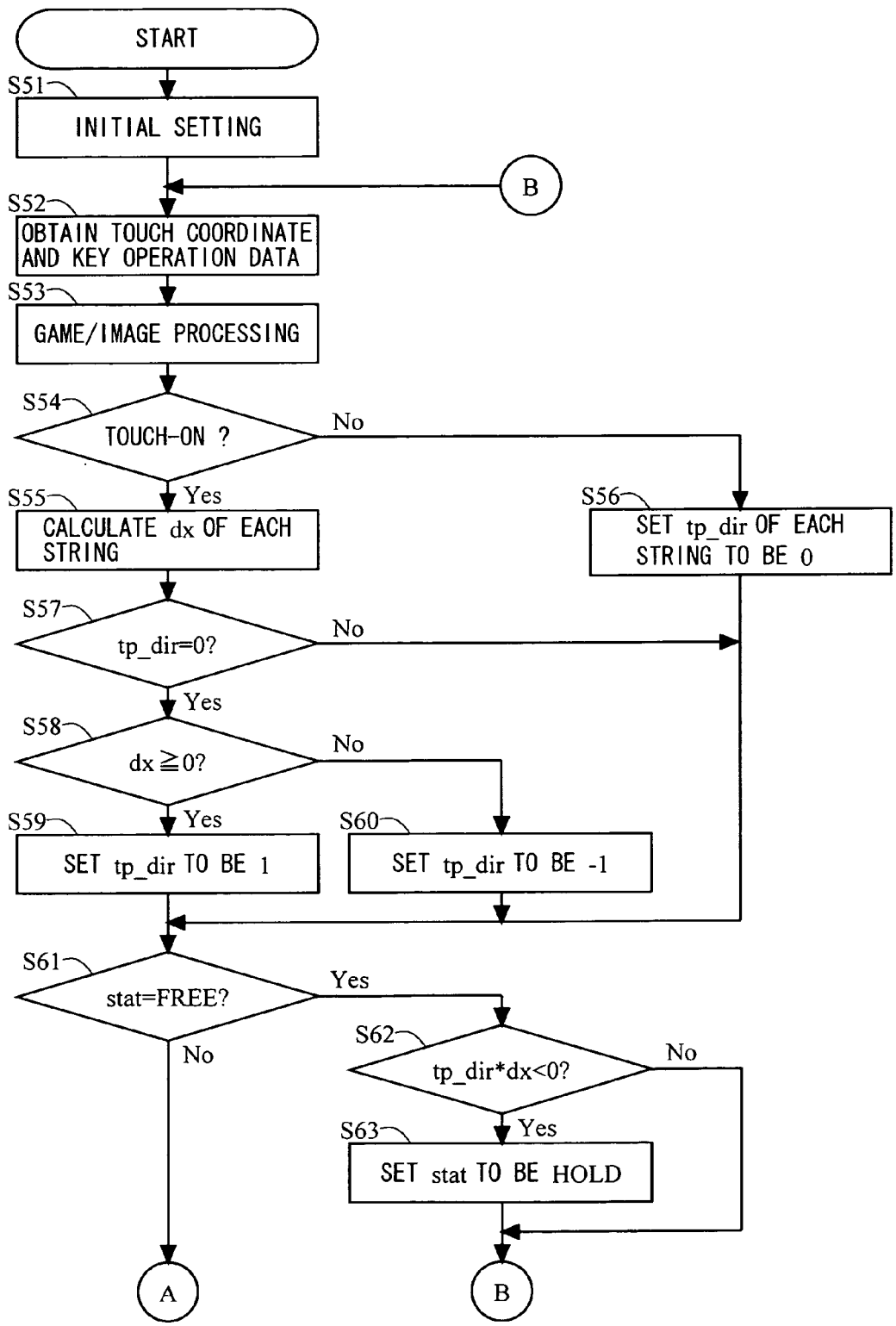
FIG. 8 is a flowchart illustrating a first half operation of a game process to be executed by the game apparatus 1.
Figure 9:
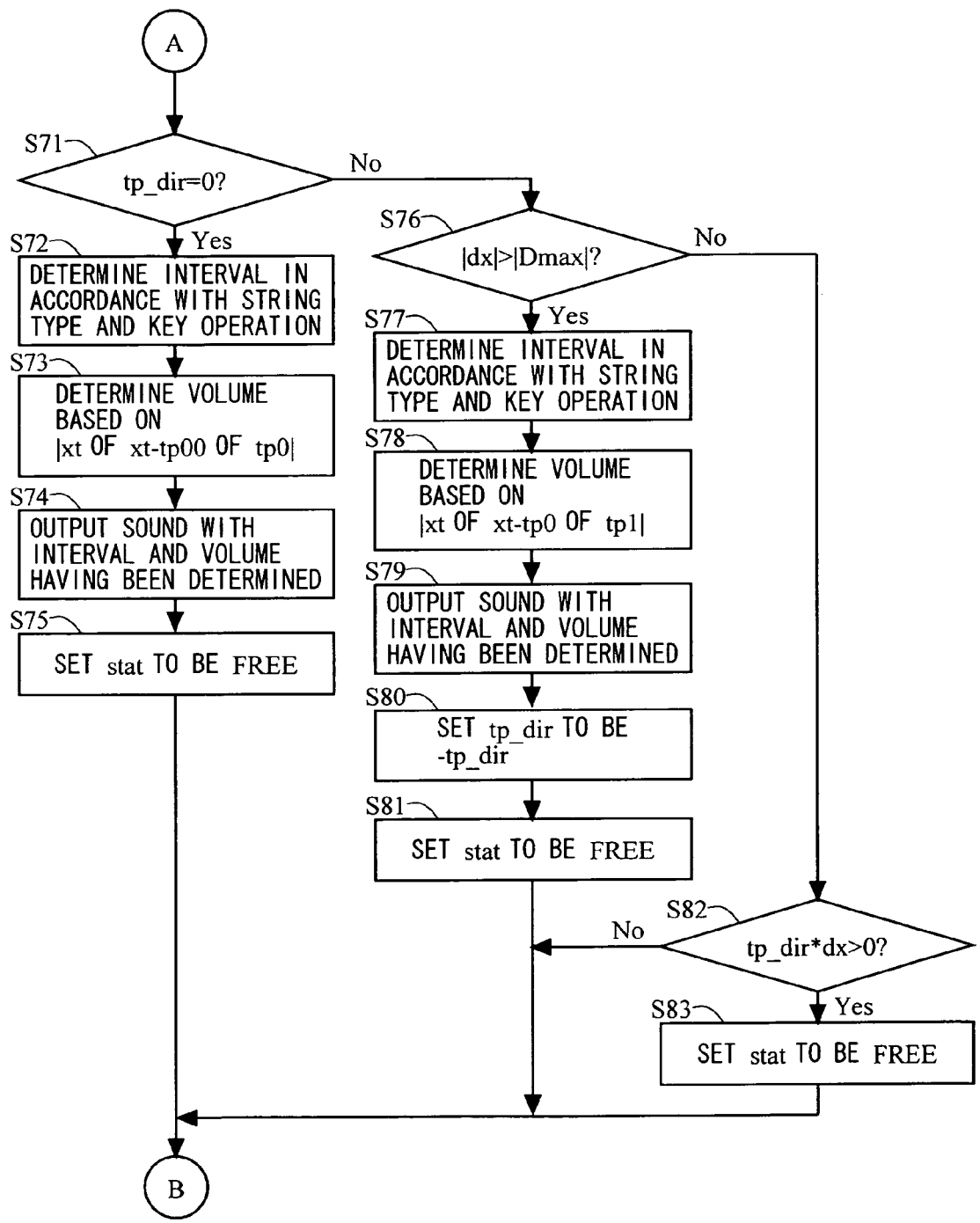
FIG. 9 is a flowchart illustrating a second half operation of the game process to be executed by the game apparatus 1.

Next, the detailed process operation of the game program to be executed by the game apparatus 1 will be described with reference to FIGS. 7 to 9. FIG. 7 exemplary shows an example of programs and data stored in the RAM 24 when executing the game program. FIG. 8 is a flowchart illustrating a first half operation of the game process to be executed by the game apparatus 1 when executing the game program. FIG. 9 is a flowchart illustrating a second half of the game process to be executed by the game apparatus 1 when executing the game program. Note that the programs for executing such a process are included in the game program stored in the ROM 17a. When a power source of the game apparatus 1 is turned on, the game program stored in the ROM 17a is loaded to the RAM 24, and the game program having been loaded to the RAM 24 is executed by the CPU core 21. Furthermore, the processing in steps 55 to 83 to be described below is simultaneously executed for each of the six string images. Therefore, the processing in steps 55 to 83 executed for the six string images may be different from each other in accordance with states of the string images having been set.

In FIG. 7, the RAM 24 stores temporally data generated by the game program and the game process having been loaded from the ROM 17a. In FIG. 7, a program storage area 24a of the RAM 24 stores a game processing program Pa, an image processing program Pb, a touch detection program Pc, a touch coordinate detection program Pd, a distance-between-touch-and-string calculation program Pe, a string state setting program Pf, a sound volume/interval determination program Pg, a touch area detection program ph, a touch history recording program Pi, etc.

The game processing program Pa defines an entirety of the game process. When the game processing program Pa is executed, the game process is caused to be started. The image processing program Pb defines, in accordance with image data Di to be described below, a process of controlling images displayed on the first LCD 11 and second LCD 12 (see FIG. 3) such as the string images ST1 to ST6, the character image PC, and the code selecting key display CK. The touch detection program Pc defines a process of detecting whether the player touch-operates the touch panel 15. The touch coordinate detection program Pd defines a process of detecting the touch coordinates tp on which the player touch-operates the touch panel 15. The distance-between-touch-and-string calculation program Pe defines a process of calculating a distance between the touch coordinates tp and each of the string position coordinates xst1 to xst6. In addition, the distance-between-touch-and-string calculation program Pe also defines, based on whether the calculated distance is positive or negative, a process of identifying a direction of the touch coordinates tp from each of the string images ST1 to ST6. The string state setting program Pf defines a process of setting each of the string images ST1 to ST6 to be in the hold state or the free state. The sound volume/interval determination program Pg defines a process of determining a volume and interval of a sound to be reproduced when each of the string images ST1 to ST6 is plucked. The touch area detection program Ph defines a process of detecting an area A in which the touch coordinates tp are disposed. The touch history recording program Pi defines a process of storing a history of the detected touch coordinates tp in a data storage area 24b.

The data storage area 24b of the RAM 24 stores touch coordinate data Da, key operating data Db, string position coordinate data Dc, area data Dd, direction-between-touch-and-string data De, distance-between-touch-and-string data Df, string state data Dg, sound data Dh, image data Di, etc.

The touch coordinate data Da indicates the touch coordinates tp on which the player touch-operates the touch panel 15. The touch coordinate data Da stores a history of the touch coordinates tp for a past several frames. Note that a frame is a time unit in which the game apparatus 1 executes the game process (1/60 second, for example). Specifically, the touch coordinate data Da stores at least touch coordinates tp1 obtained in a current frame, touch coordinates tp0 obtained in a frame preceding the current frame by one frame, and touch coordinates tp00 obtained in a frame preceding the current frame by two frames. The key operation data Db stores, as necessary, an operation signal outputted from the operation switch unit 14 and a parameter calculated based on the operation signal. The string position coordinate data Dc indicates each of the string position coordinates xst1 to xst6, which respectively represents a position of each of the string images ST1 to ST6 in the screen coordinate system. The area data Dd represents a position of each of the plurality of areas A in the screen coordinate system.

The direction between-touch-and-string data De stores direction data tp_dir indicating a direction in which the touch coordinates tp is positioned from each of the string images ST1 to ST6. Specifically, in the case where the touch coordinates tp are positioned at the right side (on an x-axis positive direction side) of each of the string images ST1 to ST6, the direction data tp_dir is set to be 1. On the other hand, in the case where the touch coordinates tp are positioned at the left side (on an x-axis negative direction side) of each of the string images ST1 to ST6, the direction data tp_dir is set to be −1. In the case where there is no touch coordinates tp (i.e., when the touch panel 15 is not touched by the player), the direction data tp_dir is set to be 0. Note that the direction data tp_dir set for each of the string images ST1 to ST6 is stored as the direction-between-touch-and-string data De. The distance-between-touch-and-string data Df stores distance data indicating a distance between a position represented by the touch coordinates tp and each of the string images ST1 to ST6. Specifically, the distance data dx is a value obtained by subtracting each of the string position coordinates xst1 to xst6 from the touch x coordinate tx. In the case where the touch coordinates tp are positioned at the right side (on the x-axis positive direction side) of the each of the string images ST1 to ST6, the distance data dx indicates a positive value. On the other hand, the touch coordinates tp are positioned at the left side (on the x-axis negative direction side) of the each of the string images ST1 to ST6, the distance data dx indicates a negative value. Note that the distance data dx also set for each of the string images ST1 to ST6 is stored as the distance-between-touch-and-string data Df. The string state data Dg sets each of the string images ST1 to ST6 to be either in the hold state (stat=HOLD) or in the free state (stat=FREE). Each of the string images ST1 to ST6 stores the string state data Dg.

The sound data Dh sets reproduction pitch and volume of a sound to be reproduced in accordance with an interval and sound volume, which both have been determined, respectively, thereby reproducing the sound from the right speaker 30a and the left speaker 30b. The image data Di displays the images such as the string images ST1 to ST6, the character image PC and the code key selecting display CK on the game screen.

Firstly, when the power source (not shown) of the game apparatus 1 is turned on, a boot program (not shown) is executed by the CPU core 21, thereby causing the game program stored in the memory card 17 to be loaded to the RAM 24. The game processing program Pa included in the game program having been loaded to the RAM 24 is executed by the CPU core 21, thereby causing steps shown in FIGS. 8 and 9 (abbreviated as "S" in FIGS. 8 and 9) to be executed.

In FIG. 8, the CPU core 21 executes an initial setting (step 51), and advances the process to step 52. For example, in the initial setting executed by the CPU core 21 in step 51, the string position coordinate data Dc and the area data Dd are set, and then the string images ST1 to ST6 and the areas A included in the performance index image are set. Furthermore, the guitar codes which can be selected in accordance with an operation inputted through the cross key 14a are also set.

Next, the CPU core 21 obtains a touch input, which is received via the touch panel 15 in accordance with an operation performed by the player, based on the touch coordinate detection program Pd and the touch history recording program Pi, and causes the RAM 24 to store, as the touch coordinate data Da, the touch coordinates tp (tx, ty) representing a touch position, in the screen coordinate system, on which the player touch-operates the touch panel 15 (step 52). Thereafter, the CPU core 21 advances the process to step 53. Also, in step 52, the CPU core 21 obtains an operation signal outputted from the operation switch unit 14 and a parameter calculated based on the operation signal, so as to be stored in the RAM 24 as the key operation data Db.

Then, the CPU core 21 executes a game/image processing (step 53) based on the image processing program Pb (step 53), and then advances the process to step 54. The CPU core 21 executes a process of displaying the images described above with reference to FIGS. 3 to 6 (the string images ST1 to ST6, the character image PC, the code selecting key display CK, for example) on the first LCD 11 and the second LCD 12 in accordance with a current progression state of a game (e.g., a state of each string image, a condition of sound reproduction, a condition of a key operation, etc.).

Next, the CPU core 21 determines whether or not the touch panel 15 is touched by the player based on the touch detection program Pc (step 54). In the case where the touch panel 15 is touched by the player, the CPU core 21 advances the process to step 55. On the other hand, in the case where the touch panel 15 is not touched by the player, the CPU core 21 advances the process to step 56.

In step 54, the CPU core 21 calculates the distance data dx of each of the string images ST1 to ST6 based on the distance-between-touch-and-string calculation program Pe, so as to be stored as the distance-between-touch-and-string data Df. Thereafter, the CPU core 21 advances the process to step 55. Note that the distance data dx is obtained by subtracting each of the string position coordinates xst1 to xst6 from an x-axis coordinate of the touch coordinates tp (the touch x coordinate) obtained in step 52. As is clear from FIG. 4, when the touch coordinates tp are positioned at the right side (on the x-axis positive direction side) of each of the string position coordinates xst1 to xst6, the distance data dx is larger than 0. On the other hand, when the touch coordinates tp are positioned at the left side (in the x-axis negative direction) of each of the string position coordinates xst1 to xst6, the distance data dx is smaller than 0. For example, in the case where the touch coordinates tp shown in FIG. 4 are obtained, the touch coordinates tp are disposed on the x-axis negative direction side of the string image ST4. Therefore, "tx−xst4<0" is stored as the distance data dx of the string image ST4. On the other hand, the touch coordinates are disposed on the x-axis positive direction side of the string image ST5. Therefore, "tx−xst5>0" is stored as the distance data dx of the string image ST5.

Thereafter, the CPU core 21 determines whether or not the direction data tp_dir which is set for the string images ST1 to ST6 is 0 (step 57). When the direction data tp_dir is 0, the CPU core 21 sets, based on the touch area detection program Ph, the direction data tp_dir of any of the string images ST1 to St6, having the distance data dx set to be equal to or larger than 0 (Yes in step 58), to be 1, so as to be stored as the direction-between-touch-and-string data De (step 59). Thereafter, the CPU core 21 advances the process to step 61. Alternatively, when the direction data tp_dir is 0, the CPU core 21 sets, based on the touch area detection program Ph, the direction data tp_dir of any of the string images ST1 to St6, having the distance data dx set to be smaller than 0 (No in step 59), to be −1, so as to be stored as the direction-between-touch-and-string data De (step 60). Thereafter, the CPU core 21 advances the process to step 61. On the other hand, when the direction data tp_dir is not 0, the CPU core 21 directly advances the process to step 61.

On the other hand, in step 54, when the touch panel 15 is not touched by the player, the CPU core 21 sets the direction data tp_dir stored in each of the string images ST1 to ST6 as the direction-between-touch-and-string data De to be 0 (step 56).

Then, the CPU core 21 advances the process to step 61. As described above, when the touch panel 15 is not touched by the player, the direction data tp_dir of each of the string images ST1 to ST6 is set to be 0. That is, in step 57, when the touch panel 15 is touched by the player, and the direction data tp_dir is also 0, the touch panel 15 is initially touch-operated (i.e., no touch coordinates have been obtained in previous frames). Therefore, in aforementioned steps 58 to 60, it is determined whether the touch coordinates tp obtained when the touch panel 15 is initially touch-operated are positioned at the right or left side of each of the string images ST1 to ST6.

In step 61, the CPU core 21 determines whether or not each of the string images ST1 to ST6 is in the free state based on the string state setting program Pf. When the string state data Dg is set to be in the free state (stat=FREE), the CPU core 21 advances the process to step 62. On the other hand, when the string state data Dg is set to be in the hold state (stat=HOLD), the CPU core 21 advances the process to step 71 (FIG. 9).

In step 62, when the string state data Dg is set to be in the free state, the CPU core 21 determines whether or not tp_dir*dx is smaller than 0 based on the touch area detection program Ph. When tp_dir*dx is smaller than 0, the CPU core 21 sets the string state dara Dg to be in the hold state (stat=HOLD) based on the string state setting program Pf (step 63), and then returns to step 52 so as to repeat the process. On the other hand, when tp_dir*dx is equal to or larger than 0, the CPU core 21 directly returns to step 52 so as to repeat the process.

As described above, when an initial process is performed in accordance with the touch panel 15 touched by the player, the direction data tp_dir is set to be 1 when the distance data dx is equal to or larger than 0; and the direction data tp_dir is set to be −1 when the distance data dx is smaller than 0. In addition, the direction data tp_dir is set to be 0 when the touch panel 15 is not touched by the player. Therefore, when the direction data tp_dir is initially set or the touch panel 15 is not touched by the player, tp_dir*dx is a positive value or 0. Thus, it is determined in step 62 that tp_dir*dr is equal to or larger than 0. On the other hand, when the touch panel 15 is touched by the player, step 55 is executed so as to calculate, as necessary, the distance data dx. Furthermore, as described above, a parameter represented by the distance data dx is a positive value when a touch position is disposed on the x-axis positive direction side of the string position coordinate xst; and the parameter represented by the distance data dx is a negative value when the touch position is disposed on the x-axis negative direction side of the string position coordinate xst. Therefore, when the player performs a slide operation on the touch panel 15 such that a touch position crosses over any of the string images ST1 to ST6, the distance dx of the crossed string image changes between a positive value and a negative value. At this time, it is determined that tp_dir*dx is smaller than 0. That is, in step 62, it is determined whether or not a slide operation is performed such that a touch position crosses over any of the string images ST1 to ST6 set to be in the free state (stat=FREE), and then sets the crossed string image to be in the hold state.

When the string state data Dg is set to be in the hold state (stat=HOLD), step 71 (see FIG. 9) is executed. Hereinafter, a string image set to be in the hold state will be specifically described. In step 71, the CPU core 21 determines whether or not the direction data tp_dir is 0. Thereafter, when the direction data tp_dir is 0, the CPU core 21 advances the process to step 72. On the other hand, when the direction data tp_dir is not 0, the CPU core 21 advances the process to step 76. Note that the process from step 72 onward is executed when the player touch-operates the touch panel 15 such that a touch position only moves within the tension limit value Dmax of each of the string images ST1 to ST6, and then releases the touch panel 15. In the following description, the process from step 76 onward will be firstly described.

When the direction data tp_dir is not 0, the CPU core 21 determines, in step 76, whether or not |dx| is larger than |Dmax| based on the touch area detection program Ph. When |dx| is larger than |Dmax |, the CPU core 21 advances the process to step 77. On the other hand, when |dx| is equal to or smaller than |Dmax|, the CPU core 21 advances the process to step 82. Note that as shown in FIG. 6, when the player performs a slide operation such that a touch position moves beyond a tension limit of any of the string images ST1 to ST6 set to be in the hold state, |dx| becomes larger than |Dmax|.

In step 77, based on the sound/interval determination program Pg, the CPU core 21 determines an interval of a sound to be reproduced, in accordance with any of the string images ST1 to ST6 set to be in the hold state and a key operation indicated by the key operation data Db stored therein. Thereafter, the CPU core 21 advances the process to step 78. Specifically, an interval of a sound to be reproduced is determined in accordance with one of the first to sixth strings of the guitar, which is set to be in the hold state, and one of the guitar codes, which is selected by the key operation performed by the player.

Next, based on the sound/interval determination program Pg, the CPU core 21 determines a volume of a sound to be reproduced, in accordance with a history of the previous touch coordinates tp stored as the touch coordinate data Da (step 78). Then, the CPU core 21 advances the process to step 79. Specifically, the CPU core 21 causes the RAM 24 to extract an x-axis coordinate value of the touch coordinates tp obtained in a current frame (xt of tp1) and an x-axis coordinate value of the touch coordinates tp obtained in a frame preceding the current frame by one frame (xt of tp0), thereby calculating |(xt of tp1)−(xt of tp0)|. Thereafter, the CPU core 21 determines a volume of the sound to be reproduced based on the calculation result. Note that |(xt of tp1)−(xt of tp0)| indicates a speed at which the touch coordinates tp moved in the x-axis direction. Thus, the CPU core 21 determines the volume of the sound in accordance with a speed at which a slide operation is performed.

Then, the CPU core 21 generates sound outputting information by means of the interval determined in step 77, the volume determined in step 78 and the sound data Dh, thereby reproducing a sound from the right speaker 30a and the left speaker 30b in accordance with the generated sound outputting information (step 79). Thereafter, the CPU core 21 sets the direction data tp_dir stored in the direction-between-touch-and-string data De to change between a positive value and a negative value (step 80), and sets the string state data Dg to be in the free state (stat=FREE) (step 81). Thereafter, the CPU core 21 returns to step 52 (FIG. 8) so as to repeat the process.

On the other hand, when it is determined in step 76 that |dx| is equal to or smaller than |Dmax|, whether or not tp_dir*dx is larger than 0 is determined based on the touch area detection program Ph (step 82). As described above in step 62 and step 63, when tp_dir*dx is smaller than 0, a string image is set to be in the hold state. However, when a slide operation is performed such that a touch position in an area A crosses over any of the string images ST1 to ST6, and then returns to the area A before crossing its tension limit range, tp_dir*dx becomes larger than 0 even if a string image is set to be in the hold state. That is, this is a phenomenon occurring when the player performs a slide operation such that he or she touches any of the string images ST1 to ST6, and then softly releases the touched string image after putting it back without being plucked. When tp_dir*dx is larger than 0 even if a string image is in the hold state (Yes in step 82), the CPU core 21 sets the string state data Dg of the string image to be in the free state (stat=FREE) (step 83) without executing a process of reproducing a sound. Thereafter, the CPU core 21 returns to step 52 (FIG. 8) so as to repeat the process. On the other hand, when tp_dir*dx is equal to or smaller than 0, the CPU core 21 directly returns to step 52 so as to repeat the process.

Alternately, in step 71, when the string state data Dg is set to be in the hold state, and the direction data tp_dir is set to be 0, step 72 is executed. Note that when the player touch-operates the touch panel 15 such that a touch position only moves without crossing over a tension limit value Dmax of each of the string images ST1 to ST6, and then releases the touch panel 15, the direction data tp_dir of a string image set to be in the hold state becomes 0.

In step 72, based on the sound/interval determination program Pg, the CPU core 21 determines an interval of a sound to be reproduced, in accordance with any of the string images ST1 to ST6 set to be in the hold state and a key operation indicated by the key operation data Db stored therein. Then, the CPU core 21 advances the process to step 73. Note that the process in step 72 is similar to that in step 77 described above. Therefore, a detailed description thereof will be omitted.

Next, based on the sound/interval determination program Pg, the CPU core 21 determines a volume of a sound to be reproduced, in accordance with a history of the previous touch coordinates tp stored as the touch coordinate data Da (step 73). Thereafter, the CPU core 21 advances the process to step 74. Note that when step 73 is executed, a touch-operation is not performed on the touch panel 15. Thus, the touch coordinates tp are not obtained in the current frame. Therefore, the CPU core 21 causes the RAM 24 to extract an x-axis coordinate value of the touch coordinates tp obtained in a frame preceding the current frame by one frame (xt of tp0) and an x-axis coordinate value of the touch coordinates tp obtained in a frame preceding the current frame by two frames (xt of tp00), thereby calculating |(xt of tp0)−(xt of tp00)|.

Then, the CPU core 21 generates sound outputting information by means of the interval determined in step 72, the volume determined in step 73 and the sound data Dh, thereby reproducing a sound from the right speaker 30a and the left speaker 30b in accordance with the generated sound outputting information (step 74). Thereafter, the CPU core 21 sets the string state data Dg to be in the free state (stat=FREE) (step 75), and returns to step 52 (FIG. 8) so as to repeat the process. Note that the processes in step 74 and step 75 are similar to those in step 79 and step 81 mentioned above. Thus, detailed descriptions thereof will be omitted. As described above, by executing steps 72 to 75, when the player performs a slide operation on the touch panel 15 such that any of the string images ST1 to ST6 is stretched to the right or left so as to be in the hold state, and then releases the touch panel 15, a sound corresponding to the stretched string image is also to be reproduced.

As described above, in a sound processing executed by the game apparatus 1, a sound is not to be reproduced even when the player touch-operates any one of the areas disposed on the touch panel 15. Instead, a sound is to be reproduced when the player performs a slide operation such that a touch position moves between any of the two areas adjacent to each other (i.e., when the player performs a slide operation such that a touch position crosses over a boundary between any of the two areas adjacent to each other). Therefore, by displaying an image simulating a portion of a stringed instrument in which each of the string images ST1 to ST6 is disposed on a boundary between each of the two areas adjacent to each other, and using operation means such as a pointing device or a controller, it becomes possible to realize an operating environment in which the player feels as if he or she played the stringed instrument displayed on the display screen. Note that each of the string images ST1 to ST6, as the performance index displayed on the second LCD 12, indicates a boundary between each of the two areas adjacent to each other.

In the aforementioned description, a range within which each of the string images ST1 to ST6 can be deformed (the tension limit range, a boundary range) is provided between each of the two areas A adjacent to each other, and each of the string images ST1 to ST6 is displayed on the second LCD 12 so as to be stretched in accordance with a slide operation. When the player performs a slide operation such that any of the string images ST1 to ST6 is deformed beyond the aforementioned range, or when the player deforms any of the string images ST1 to ST6 and then releases the deformed string image, a sound corresponding to the deformed string image is to be reproduced. That is, a sound is to be reproduced when the player touch-operates the touch panel 15 so as to pluck any of the string images ST1 to ST6 displayed on the second LCD 12. Thus, the player can feel as if he or she played the stringed instrument by deforming and plucking the string images displayed on the display screen.

When it is not necessary to have such an effect produced by deforming a string image, the tension limit range (the tension limit value Dmax) of each of the string images ST1 to ST6 may not be provided. For example, as shown in FIG. 4, etc., a sound may be immediately reproduced when a slide operation is performed such that the touch coordinates tp move between the areas A01, A12, A23, A34, A45, A56, and A67, all of which are formed adjacent to each other. Alternately, a predetermined gap may be formed between each of the two areas adjacent to each other. Also, in this case, a sound is to be reproduced when a slide operation is performed such that the touch coordinates tp move between any of the two areas adjacent to each other.

In the aforementioned description, as the performance index image displayed on the second LCD 12, the string images ST1 to ST6, each of which is the performance index, are arranged in parallel with each other in a vertical direction. The string images ST1 to ST6 may be arranged in parallel with each other in other directions. For example, even if the string images ST1 to ST6 are arranged in parallel with each other in a horizontal direction or in a diagonal direction as the performance index image displayed on the second LCD 12, it is understood that an example embodiment of the present invention can be realized.

Furthermore, the performance indexes displayed on the second LCD 12 may not be the six string images ST1 to ST6. As described above, it can be assumed that each of the string images ST1 to ST6 merely indicates the boundary between each of the two areas adjacent to each other, and an example embodiment of the present invention can be realized only if a plurality of areas A are set so as to detect a slide operation which reproduces a sound. Therefore, in order to realize an example embodiment of the present invention, two adjacent areas A are set so as to include one image string displayed on the second LCD 12 on a boundary therebetween. Alternately, the performance indexes indicating boundaries between any two areas adjacent to each other may be two to five, or seven or more string images. Still alternatively, the performance indexes indicating boundaries between any two areas adjacent to each other are not limited to straight lines simulating the strings. The performance indexes may be curves or closed curves.

In the aforementioned description, the interval of the sound to be reproduced is determined in accordance with any of the string images having been plucked. However, the interval of the sound to be reproduced may be determined in accordance with a combination of areas through which a slide operation is performed.

In the aforementioned description, the interval of the sound to be reproduced is determined in accordance with any of the string images having been plucked and a key operation performed through the cross key 14a. However, the interval of the sound to be reproduced may be changed in accordance with a key operation performed through other keys. For example, when the player plays the stringed instrument, pushing down the "L" button 14L, the interval of the sound to be reproduced may be increased by a semitone to one tone and a half. Thus, the game apparatus 1 can realize a musical play in which a so-called choking method is used.

In the aforementioned embodiment, as an example of a liquid crystal display unit having two screens, the liquid crystal display unit including the first LCD 11 and the second LCD 12, both of which are physically separated from each other, are disposed one on top of the other (i.e., the liquid crystal unit having an upper and a lower screens). However, the display unit having two screens may be formed in other manners. For example, the first LCD 11 and the second LCD 12 may be disposed side-by-side on a main surface of the lower housing 13b. Alternately, a vertically long rectangular LCD having the same horizontal length as that of the second LCD 12 and a vertical length twice as long as that of the second LCD 12 (i.e., a physically single LCD on the main surface of the lower housing 13b so that the game image and the performance index image are displayed one on top of the other (i.e., displayed adjacent to each other without a boundary portion between an upper screen and a lower screen). Still alternately, a horizontally long rectangular LCD having the same vertical length as that of the second LCD 12 and a having a vertical length as long as that of a display unit having the two screens) may be disposed horizontal length twice as long as that of the second LCD 12 may be disposed on the main surface of the lower housing 13b so that the game image and the performance index image are displayed side-by-side (i.e., displayed adjacent to each other without a boundary portion between a right screen and a left screen). In other words, a physically single screen may be divided into two screens so as to display the game image and the performance index image thereon, respectively. Even if the game image and the performance index image are displayed in any of the aforementioned manners, an example embodiment of the present invention can be realized as long as the touch panel 15 is disposed on a screen on which the performance index image is displayed. When the physically single screen is divided into the two screens so as to display the game image and the performance index image thereon, respectively, the touch panel 15 may be disposed on an entirety of the single screen.

In the aforementioned embodiment, the touch panel 15 is integrally provided with the game apparatus 1. However, it is understood that an example embodiment of the present invention can be realized if the game apparatus 1 and the touch panel 15 are separately provided. Alternately, the touch panel 15 may be provided on a surface of the first LCD 11 so as to display the performance index image thereon. Still alternately, in the aforementioned embodiment, the two display screens (the first LCD 11 and the second LCD 12) are provided. However, only one display screen may be provided. That is, in the aforementioned embodiment, the first LCD 11 may be eliminated, and the touch panel 15 may be provided on a display screen only comprised of the second LCD 12 on which the performance index image is displayed. Alternatively, in the aforementioned embodiment, the second LCD 12 may be eliminated, and the touch panel 15 may be provided on a display screen only comprised of the first LCD 11 on which the performance index image is displayed.

In the aforementioned embodiment, the game apparatus 1 includes the touch panel which is used as input means. However, other pointing devices may be used as the input means. Note that the pointing devices are input devices for specifying positions or coordinates inputted on the screen. For example, by using a mouse, a trackpad or a trackball as the input means, and calculating positional information corresponding to the screen coordinate system based on an output value outputted from the input means, an example embodiment of the present invention can be also realized. If it is not necessary to have an effect produced by the player directly touching the performance index image, an example embodiment of the present invention may be realized by detecting an area designated by an input device other than the pointing device (e.g., a direction instructing key or a joystick). In this case, an example embodiment of the present invention can be realized even if a game apparatus, in which an operation cannot be performed by means of a pointing device, is used.

In the aforementioned embodiment, the game apparatus 1 is a hand-held apparatus. However, an example embodiment of the present invention may be realized by causing an information processing apparatus such as a stationary apparatus or a general personal computer to execute the sound processing program of an example embodiment of the present invention.

In a storage medium storing a sound processing program of an example embodiment of the present invention and a sound processing apparatus, an image simulating a portion of a stringed instrument is displayed on a display screen included in a personal computer, a game apparatus or the like, thereby realizing an operating environment in which a player feels as if he or she played the stringed instrument displayed on the display screen by means of operation means such as a pointing device and a controller. Thus, the storage medium storing the sound processing program and the sound processing apparatus are applicable to an apparatus capable of realizing a play of an electrical musical instrument, a program executed by the apparatus, and the like.

While example embodiments of the invention have been described in detail, the foregoing description is in all aspects illustrative and not restrictive. It is understood that numerous other modifications and variations can be devised without departing from the scope of the invention.

What is claimed is:

1. A storage medium storing a sound processing program which causes a sound processing apparatus to function as a music playing apparatus, the sound processing apparatus to be operated in accordance with an operation input received from an input device operated by a player, the sound processing program instructing a computer of the sound processing apparatus to perform:

setting a plurality of areas on an image displayed on a display screen;

controlling display of performance indexes, stored in a memory, each of which indicates a range of each of the plurality of areas on the display screen;

storing a history of an operation input received from the input device in the memory;

detecting one of the areas designated in accordance with the operation input;

generating sound output information when, in the area detecting, the operation input, which designates the one of the areas, and further designates an area other than the area having been designated, is detected based on the history of the operation input; and outputting a sound from a speaker in accordance with the sound output information.

2. The storage medium storing the sound processing program according to claim 1, wherein in the area setting, the plurality of areas are set to be adjacent to and in parallel with each other, and in the controlling of the display of performance indexes, the performance indexes, each of which indicates a boundary between each two of the areas adjacent to each other, are displayed on the display screen.

3. A storage medium storing a sound processing program which causes a sound processing apparatus to function as a music playing apparatus, the sound processing apparatus to be operated in accordance with an operation input received from an input device operated by a player, the sound processing program instructing a computer of the sound processing apparatus to perform:

setting a plurality of areas on an image displayed on a display screen;

controlling display of performance indexes, stored in a memory, each of which indicates a range of each of the plurality of areas on the display screen;

storing a history of an operation input received from the input device in the memory;

detecting one of the areas designated in accordance with the operation input;

generating sound output information when, in the area detecting, the operation input, which designates the one of the areas, and further designates an area other than the area having been designated, is detected based on the history of the operation input;

outputting a sound from a speaker in accordance with the sound output information;

wherein in the area setting, the plurality of areas are set to be adjacent to and in parallel with each other;

in the controlling of the display of performance indexes, the performance indexes, each of which indicates a boundary between each two of the areas adjacent to each other, are displayed on the display screen;

in the area setting, a boundary range having a predetermined width is set in a vicinity of the boundary between each two of the areas adjacent to each other;

in the area detecting, the operation input, which designates an area within the boundary range or an area beyond the boundary range, is further detected; and in the sound output generating, the sound output information is generated when, in the area detecting, the operation input, which designates the one of the areas, and crosses over the boundary range set in the vicinity of the boundary between the area and another area adjacent to the area such that the said another area is further designated, is detected based on the history of the operation input.

4. The storage medium storing the sound processing program according to claim 3, wherein in the performance index display, each of the performance indexes is deformed within the boundary range in accordance with the operation input, and displayed on the display screen.

5. A storage medium storing a sound processing program which causes a sound processing apparatus to function as a music playing apparatus, the sound processing apparatus to be operated in accordance with an operation input received from an input device operated by a player, the sound processing program instructing a computer of the sound processing apparatus to perform:

setting a plurality of areas on an image displayed on a display screen;

controlling display of performance indexes, stored in a memory, each of which indicates a range of each of the plurality of areas on the display screen;

storing a history of an operation input received from the input device in the memory;

detecting one of the areas designated in accordance with the operation input;

generating sound output information when, in the area detecting, the operation input, which designates the one of the areas, and further designates an area other than the area having been designated, is detected based on the history of the operation input;

outputting a sound from a speaker in accordance with the sound output information;

wherein in the area setting, the plurality of areas are set to be adjacent to and in parallel with each other;

in the controlling of the display of performance indexes, the performance indexes, each of which indicates a boundary between each two of the areas adjacent to each other, are displayed on the display screen;

the sound processing program instructs the computer to further perform detecting whether or not an operation input is received from the input device, in the area setting, a boundary range having a predetermined width is set in a vicinity of the boundary between each two of the areas adjacent to each other;

in the area detecting, the operation input, which designates an area within the boundary range or an area beyond the boundary range, is further detected; and in the sound output generating, the sound output information is generated when, in the area detecting, the operation input, which designates the one of the areas, and crosses over the boundary range set in the vicinity of the boundary between the area and another area adjacent to the area such that the said another area is further designated, is detected based on the history of the operation input, and in the operation input detecting, it is detected that the operation input detected by the area detecting is lost.

6. The storage medium storing the sound processing program according to claim 5, wherein in the controlling of the display of performance indexes, each of the performance indexes is deformed within the boundary range in accordance with the operation input, and displayed on the display screen.

7. The storage medium storing the sound processing program according to claim 1, wherein in the sound output generating, when the one of the areas is designated, and an area other than the area having been designated is further designated, an interval of the sound to be reproduced is determined in accordance with a combination of the areas having been designated.

8. A storage medium storing a sound processing program which causes a sound processing apparatus to function as a music playing apparatus, the sound processing apparatus to be operated in accordance with an operation input received from an input device operated by a player, the sound processing program instructing a computer of the sound processing apparatus to perform:

setting a plurality of areas on an image displayed on a display screen;

controlling display of performance indexes, stored in a memory, each of which indicates a range of each of the plurality of areas on the display screen;

storing a history of an operation input received from the input device in the memory;

detecting one of the areas designated in accordance with the operation input;

generating sound output information when, in the area detecting, the operation input, which designates the one of the areas, and further designates an area other than the area having been designated, is detected based on the history of the operation input; and outputting a sound from a speaker in accordance with the sound output information;

in the sound output generating, when the one of the areas is designated, and an area other than the area having been designated is further designated, an interval of the sound to be reproduced is determined in accordance with one of the performance indexes displayed on a boundary between the areas having been designated.

9. A storage medium storing a sound processing program which causes a sound processing apparatus to function as a music playing apparatus, the sound processing apparatus to be operated in accordance with an operation input received from an input device operated by a player, the sound processing program instructing a computer of the sound processing apparatus to perform:

setting a plurality of areas on an image displayed on a display screen;

controlling display of performance indexes, stored in a memory, each of which indicates a range of each of the plurality of areas on the display screen;

storing a history of an operation input received from the input device in the memory;

detecting one of the areas designated in accordance with the operation input;

generating sound output information when, in the area detecting, the operation input, which designates the one of the areas, and further designates an area other than the area having been designated, is detected based on the history of the operation input; and outputting a sound from a speaker in accordance with the sound output information;

wherein the input device includes a pointing device of outputting, in accordance with an operation performed by the player, input coordinates corresponding to a coordinate system of the display screen, as the operation input;

in the area setting, the plurality of areas are set to be adjacent to and in parallel with each other;

each of the performance indexes is an image simulating a portion of a musical instrument, and disposed on a boundary between each two of the areas adjacent to each other;

in the operation history storing, a history of the input coordinates outputted from the pointing device is stored in the memory;

in the area detecting, one of the areas including a position indicated by the input coordinates is detected as an area designated in accordance with the operation input; and in the sound output information generating, the sound output information is generated, when it is detected, in the area detecting, that the area including the position indicated by the input coordinates is changed to another area, in accordance with one of the performance indexes disposed on the boundary between the area and the said another area.

10. The storage medium storing the sound processing program according to claim 9, wherein in the sound output information generating, a volume of the sound to be reproduced is determined in accordance with a speed at which the input coordinates move from the area to the said another area.

11. The storage medium storing the sound processing program according to claim 9, wherein the pointing device is a touch panel covering the display screen;

in the operation history storing, a history of touch coordinates at which the player touch-operates the touch panel is stored in the memory;

in the area detecting, one of the areas, within which a position indicated by the touch coordinates is overlapped, is designated as an area designated in accordance with the operation input; and in the sound output generating, the sound output information is generated when it is detected, in the area detecting, that the area, within which the position indicated by the touch coordinates is overlapped, is changed to another area based on the history of the touch coordinates.

12. The storage medium storing the sound processing program according to claim 9, wherein the input device includes the pointing device and other operation section other than the pointing device;

the sound processing program instructs the computer to further perform obtaining an operation signal outputted from the operation section; and in the sound output information generating, an interval of the sound is set, when the area including the position indicated by the input coordinates is changed to another area, in accordance with a combination of the area and said another area, and an interval of the sound to be reproduced is determined by varying the interval of the sound in accordance with the obtained operation signal.

13. A sound processing apparatus to be operated in accordance with an operation input received from an input device operated by a player, the sound processing apparatus comprising:

a storage memory;

area setting programmed logic circuitry of setting a plurality of areas on an image displayed on a display screen;

performance index display controlling programmed logic circuitry of displaying performance indexes, stored in the storage memory, each of which indicates a range of each of the plurality of areas on the display screen;

operation history storing programmed logic circuitry of storing a history of an operation input received from the input device in the storage memory;

area detecting programmed logic circuitry of detecting one of the areas designated in accordance with the operation input;

sound output information generating programmed logic circuitry of generating sound output information when, in the area detecting programmed logic circuitry, the operation input, which designates the one of the areas, and further designates an area other than the area having been designated, is detected based on the history of the operation input; and sound output controlling programmed logic circuitry of outputting a sound from a speaker in accordance with the sound output information.

14. The storage medium storing the sound processing program according to claim 1, wherein one of the performance indexes forms a boundary between the area having been designated and the area other than the area having been designated, and in the sound output information generating, the sound output information is generated when, in the area detecting, the operation input crosses over the boundary.

15. A sound processing apparatus as in claim 13, wherein one of the performance indexes forms a boundary between the area having been designated and the area other than the area having been designated, and in the sound output information generating programmed logic circuitry, the sound output information is generated when the area detecting programmed logic circuitry detects that the operation input crosses over the boundary.

* * * * *